Nov. 27, 1951  R. F. DONOVAN  2,576,579
CONE GRIP LOCK NUT
Filed March 16, 1951  2 SHEETS—SHEET 1
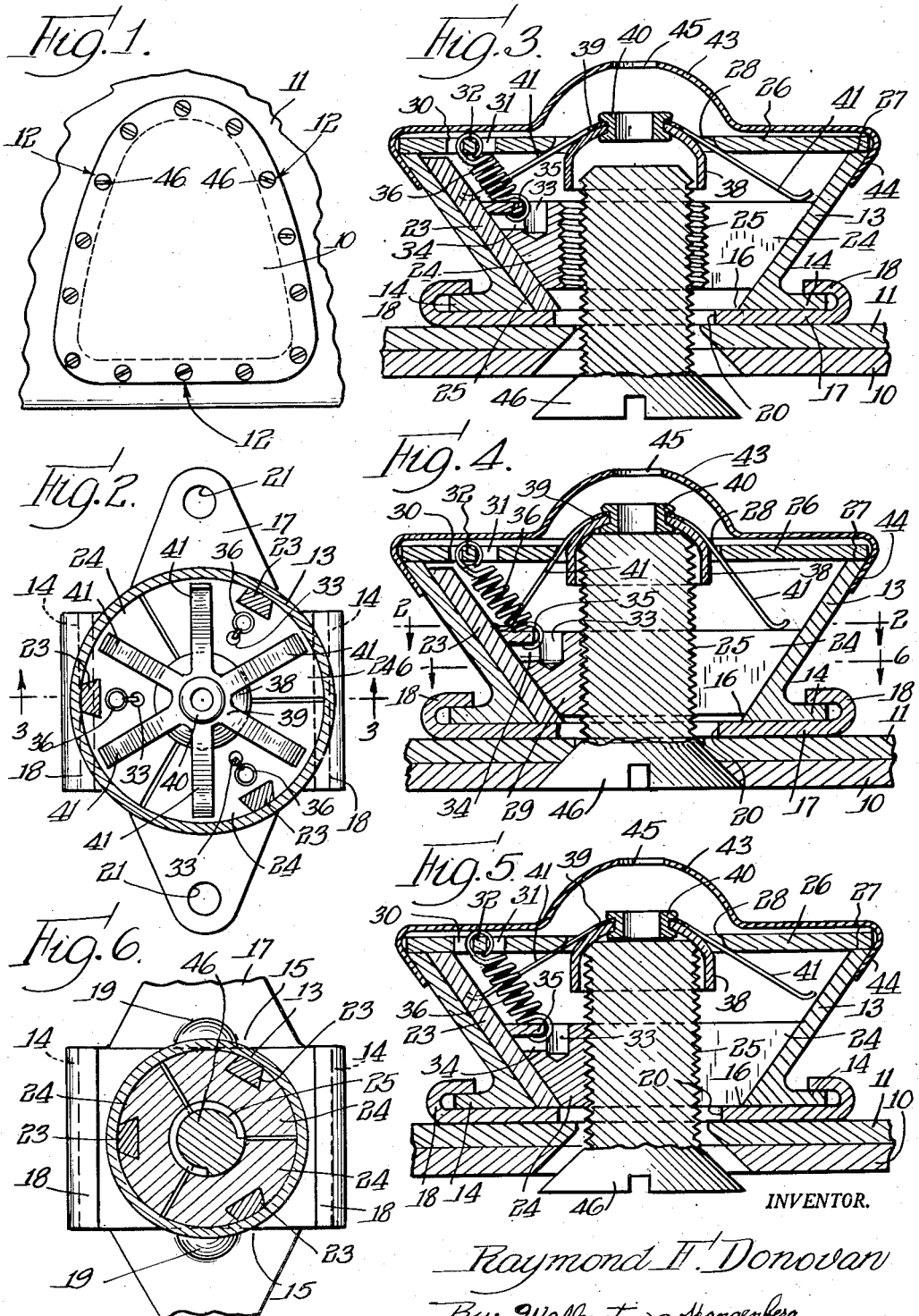
INVENTOR.
Raymond F. Donovan
By: Wallenstein & Spangenberg  Attys.

Nov. 27, 1951  R. F. DONOVAN  2,576,579
CONE GRIP LOCK NUT
Filed March 16, 1951  2 SHEETS—SHEET 2
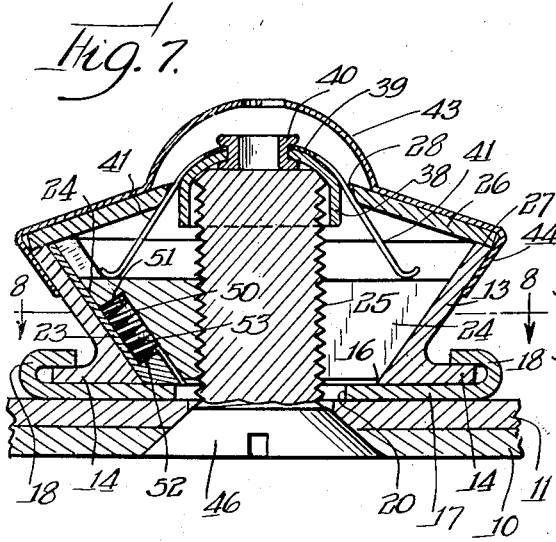
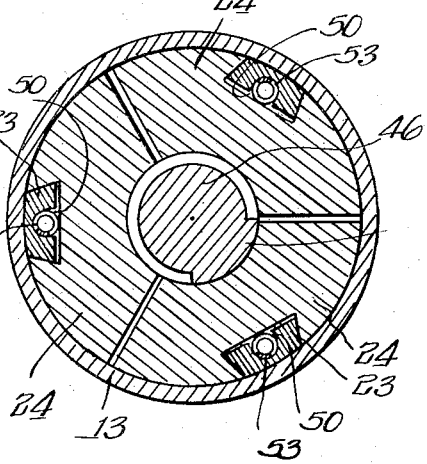
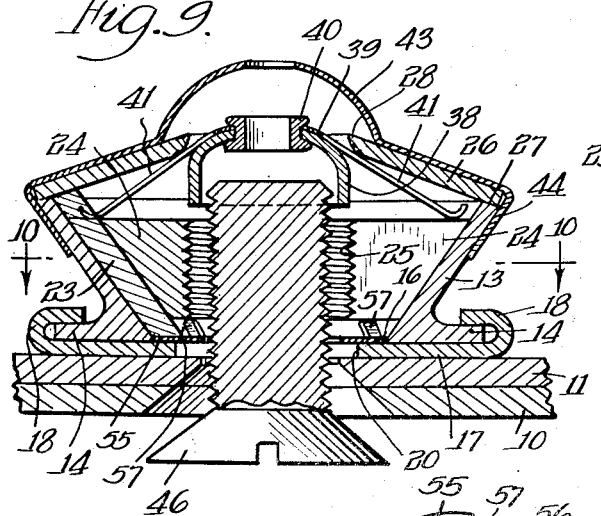
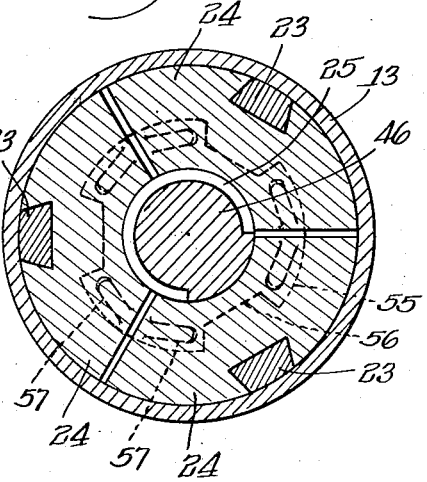
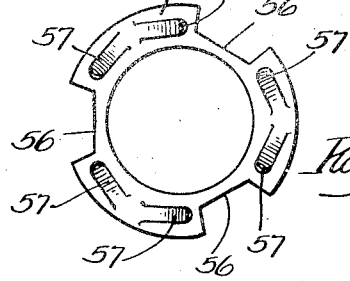
INVENTOR.
Raymond F. Donovan
BY
Wallenstein & Spangenberg
Attys.

Patented Nov. 27, 1951

2,576,579

UNITED STATES PATENT OFFICE 2,576,579

CONE GRIP LOCK NUT

Raymond F. Donovan, Huntington, N. Y., assignor of thirty-five per cent to John J. Murphy, Chicago, Ill.

Application March 16, 1951, Serial No. 215,969

11 Claims. (Cl. 151—19)

This invention relates to fastening assemblies and more particularly to fastening assemblies adapted to secure the skin of airplane wings and the like, but having other uses where the same general conditions are encountered. The fastening assembly of this invention is an improvement over that disclosed and claimed in application Serial No. 106,357, filed July 23, 1949 by John J. Murphy.

Airplanes are so designed that the maximum lightness consistent with requisite strength is obtained and to this end, in recent years, the outside metal skin is stressed and carries a major portion of the load. There are many instances in which the inside of aircraft must be made available for service, removal of component parts, and the like, as, for example, in the case of jet engines which are replaced relatively frequently, and for this reason it has been the practice to provide removable panels and doors in the skin of the wings and the like at a convenient spot for such service, removal of component parts and the like. Cutouts such as panels and doors introduce a factor of compromise in the lightness otherwise provided by loading the skin in that heavy reinforcing members are frequently required to carry the load around the cutout portion. Sometimes such a compromise is avoided by securely fastening the panel or door to the skin by means of bolts or knockout rivets, thus transmitting the load to and through the said door or panel. In such cases the original purpose of the cutout in the form of the door or panel, that is to say, quick accessibility, is wholly or partially lost, due to the fact that the major portion of time is required to remove the fastening means employed and to replace the same when the cutout is replaced.

Because of the above considerations, there has been a need for a long period of time of a construction in which a cutout can be made to carry its full proportional load of a stressed skin and in which the said cutout is easily and quickly removed or replaced. More specifically, there has been a need for a fastening mechanism for cutouts such as those described which can develop the full load carrying capacity of a standard bolt and which can be quickly assembled and disassembled. A fastener to meet the requirements of the situation preferably should also be capable of utilization from only one side of the cutout.

The principal object of this invention is the provision of an improved fastening means for cutouts in airplane wings and the like.

Another object is the provision of an improved nut assembly which can be used to develop the full load carrying capacity of a standard bolt used on an airplane wing cutout or the like, and which will permit rapid assembly and disassembly of the structure comprising said cutout.

Still another object is the provision of a fastening means for an airplane wing cutout or the like which can be utilized from only one side of the cutout but which, nevertheless, will so completely attach the cutout that it is capable of carrying its full load as part of a stressed skin member.

A further object is the provision of an improved nut assembly having particular advantage in airplane construction where lightness and rapid operation are important, but having uses in other locations where similar factors are important.

Another object of this invention is to provide an improved nut assembly wherein a bolt may be readily inserted therein and given a few turns for tightening the same and wherein the bolt may be loosened by a few turns and then readily withdrawn therefrom.

Other objects of this invention reside in the details of construction of the nut assembly and the cooperative relationship between the component parts thereof.

Further objects and advantages of this invention will become apparent to those skilled in the art upon reference to the accompanying specification, claims and drawings, in which:

Fig. 1 is a fragmentary plan view of a portion of an airplane wing showing a cutout supported by the fastener assembly of this invention;

Fig. 2 is an enlarged horizontal sectional view of the fastener assembly taken substantially along the line 2—2 of Fig. 4;

Fig. 3 is a vertical sectional view through the fastener assembly taken substantially along the line 3—3 of Fig. 2 showing the parts in the position for reception of the fastening bolt or screw;

Fig. 4 is a view similar to Fig. 3 showing the fastening assembly tightened;

Fig. 5 is a view similar to Figs. 3 and 4 but showing the fastening screw or bolt about to be removed;

Fig. 6 is a horizontal sectional view taken substantially along the line 6—6 of Fig. 4;

Fig. 7 is a vertical sectional view similar to Fig. 4 but showing another form of the invention;

Fig. 8 is a horizontal sectional view taken substantially along the line 8—8 of Fig. 7;

Fig. 9 is a vertical sectional view similar to Fig. 3 but showing still another form of the invention;

Fig. 10 is a horizontal sectional view taken substantially along the line 10—10 of Fig. 9; and Fig. 11 is a plan view of a resilient member utilized in Figs. 9 and 10.

Referring first to Fig. 1, a cutout 10 is shown to be inserted in the wing skin 11 of an airplane in overlapping relation thereto. The cutout 10 and skin 11 are secured together by the fastening assemblies of this invention, indicated generally by the reference character 12. This figure illustrates an important use of this invention in that the cutout 10 is quickly removable for access to the interior of the wing and is quickly replaceable in such a manner that the cutout is for all practical purposes a continuation of the wing skin and will carry its proportional load as the skin is stressed.

As illustrated in Figs. 2 to 6, one form of the nut assembly 12 includes a shell 13 having an annular tapered side wall and a pair of side flanges 14 extending laterally from the smaller end of the shell. The side flanges blend in with the shell and terminate at 15, as indicated in Fig. 6. The smaller end of the shell 13 is provided with a central opening 16. The shell 13 is secured to an elongated mounting plate 17 by means of ears 18 formed over the side flanges 14. The engagement of the ears and side flanges hold the shell on the mounting plate and prevent rotation of the shell with respect to the mounting plate. The mounting plate 17 is also provided with up-turned lugs 19 engaging the edges 15 of the flanges to prevent movement of the shell longitudinally along the elongated mounting plate 17. The mounting plate 17 is also provided with a pair of holes 21 for securing the mounting plate and hence the fastener assembly to the skin 11, as by means of rivets or the like. The mounting plate is further provided with a central opening 20 in alignment with the opening 16 in the shell 13.

The inside of the shell 13 has a plurality of tongues 23 secured thereto, as by welding. Located within the shell 13 are a plurality of nut segments 24 which are peripherally tapered to engage and be guided by the tapered shell 13. These nut segments 24 are provided with grooves for receiving the tongues 23 of the shell 13 and the inner surfaces of the nut segments 24 are provided with screw threads 25. The nut segments 24 may be moved upwardly and downwardly in the shell 13 and in so doing they are spread apart in the upper position and drawn together in the lower position. The shell 13 and the tongues 23 guide the movement of the nut segments 24 and prevent rotation of the nut segments with respect to the shell 13.

A plate 26 is secured to the larger end of the shell 13 at 27, as by welding or the like. The plate 26 is provided with a central opening 28. The plate also is provided with a plurality of holes 30 and 31 forming therebetween a plurality of anchor pieces 32. Likewise, each nut segment 24 is provided with holes 33 and 34 for providing an anchor piece 35. Tension springs 36 hooked over the anchor pieces 32 and 35 operate as resilient means for urging the nut segments 24 toward the larger end of the shell 13.

A cup shaped member 38, located at the larger end of the shell 13, has a resilient member 39 secured thereto by a rivet 40. The resilient member 39 has a plurality of radially extending fingers 41 which engage the edge of the opening 28 in the plate 26 and the upper surfaces of the nut segments 24. These fingers 41 act as levers for moving the nut segments 24 toward the smaller end of the tapered shell 13 against the action of the tension springs 36.

A dust cap 43 is secured by a flange 44 over the larger end of the shell 13 and it may be provided with a central opening 45.

A fastening screw or bolt 46 is adapted to be inserted through the openings 20 and 16 in the mounting plate and shell 13 between the nut segments 24 for the purpose of clamping together the cutout 10 and skin 11. The nut assembly normally assumes the position illustrated in Fig. 3, the nut segments 24 being urged toward the larger end of the shell by the springs 36. When the fastening bolt or screw 46 is inserted into the nut assembly, as illustrated in Fig. 3, it may be freely inserted since the nut segments 24 are spread apart. In inserting the bolt 46 the inner end of the bolt then engages the cup shaped member 38 to force the same upwardly. When this occurs the fingers 41 bend about the cup shaped member 38 by reason of their engagement with the edge of the hole 28 in the plate 26. These fingers 41 then carry the nut segments 24 toward the smaller end of the shell 13 against the action of the springs 36 until the nut segments 24 are brought into engagement with the bolt 46. A few turns of the bolt 46 then causes tightening of the fastening assembly, as is illustrated in Fig. 4.

In order to release the bolt 46 from the nut assembly the bolt is given a few turns in the loosening direction. In so doing the cup shaped member 38 follows the bolt 46 and the fingers 41 disengage the nut segments 24, as illustrated in Fig. 5. The spring 36 then pulls the nut segments 24 toward the larger end of the shell 13 whereupon the bolt 46 is released and may be readily withdrawn. Thus the bolt may be readily inserted in the nut assembly and given a few turns for tightening the same and the bolt may be loosened by a few turns and then readily withdrawn from the nut assembly. The nut assembly develops the full load carrying capacity of any standard bolt in both shear and tension so that large loads may be carried and yet rapid assembly and disassembly is afforded. The dust cap 43 prevents the parts in the assembly from becoming dirty so that continued operation of the nut assembly is assured. In order to clean the device of any dirt that may lodge therein all that is necessary is to blow air through the opening 20 and the air and dislodged dirt may then pass through the opening 45 in the dust cover 43.

The form of the invention illustrated in Figs. 7 and 8 is essentially the same as that illustrated in Figs. 2 to 6 and like reference characters have been utilized for like parts. The essential difference between the two constructions lies in the resilient means for urging the nut segments 24 toward the larger end of the shell 13. In this connection, each tongue 23 is provided with a groove 50 for accommodating a compression spring 53. One end of the compression spring 53 abuts against a surface 51 on the nut segment extending into the groove 50 and against a surface 52 on the tongue. The compression springs 53 urge the nut segments 24 toward the larger end of the shell 13. By reason of this spring arrangement less room is needed above the nut segments 24 and, therefore, the nut assembly may be made somewhat more compact. The manner of operation of the nut assembly of Figs. 7 and 8 is the same as that described above in connection with the form of the invention illustrated in Figs. 2 to 6.

Figs. 9, 10 and 11 illustrate a further form of the nut assembly. This nut assembly is substantially the same as that illustrated in Figs. 2 to 6 but again differs therefrom in the manner of urging the nut assemblies 24 toward the larger end of the tapered shell 13. In this connection a disc or washer 55 of resilient material is carried by the mounting plate 17 within the opening 16 in the smaller end of the tapered shell 13. The disc 55 is cut out at 56 for accommodating the tongues 23. It is also provided with a plurality of fingers 57 extending upwardly therefrom and engaging the lower surfaces of the nut segments 24. These fingers 57, which are resilient, operate resiliently to urge the nut segments 24 toward the larger end of the tapered shell 13. The manner of operation of this form of the invention is the same as that set forth above in connection with Figs. 2 to 6 and like reference characters have been utilized for like parts.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A nut assembly comprising, a tapered shell having an opening at its smaller end, a plurality of segments together forming a nut, the segments being housed within the shell and peripherally tapered to engage and be guided by the shell, means for preventing rotation of the nut segments with respect to the shell, resilient means urging the nut segments toward the larger end of the shell, and means engaged by a bolt inserted through the opening in the smaller end of the shell and between the nut segments for forcing the nut segments against the action of the resilient means toward the smaller end of the shell into engagement with the bolt.

2. A nut assembly comprising, a tapered shell having an opening at its smaller end, a plate on the larger end of the shell and having an opening therein, a plurality of segments together forming a nut, the segments being housed within the shell and peripherally tapered to engage and be guided by the shell, means for preventing rotation of the nut segments with respect to the shell, resilient means urging the nut segments toward the larger end of the shell, and a member engaging the nut segments and the edge of the opening in the plate and engaged by a bolt inserted through the opening in the smaller end of the shell and between the nut segments for forcing the nut segments against the action of the resilient means toward the smaller end of the shell into engagement with the bolt.

3. A nut assembly comprising, a tapered shell having an opening at its smaller end, a plate on the larger end of the shell and having an opening therein, a plurality of segments together forming a nut, the segments being housed within the shell and peripherally tapered to engage and be guided by the shell, means for preventing rotation of the nut segments with respect to the shell, resilient means urging the nut segments toward the larger end of the shell, a member movable in the opening in the plate, and a plurality of fingers carried by the member engaging the nut segments and the edge of the opening in the plate and movable when the member is engaged by a bolt inserted through the opening in the smaller end of the shell and between the nut segments for forcing the nut segments against the action of the resilient means toward the smaller end of the shell into engagement with the bolt.

4. A nut assembly comprising, a tapered shell having an opening at its smaller end, a plate on the large end of the shell, a plurality of segments together forming a nut, the segments being housed within the shell and peripherally tapered to engage and be guided by the shell, means for preventing rotation of the nut segments with respect to the shell, resilient means urging the nut segments toward the larger end of the shell, and lever means engaging the nut segments and the plate and engaged by a bolt inserted through the opening in the smaller end of the shell and between the nut segments for forcing the nut segments against the action of the resilient means toward the smaller end of the shell into engagement with the bolt.

5. A nut assembly comprising, a tapered shell having an opening at its smaller end, a plate on the larger end of the shell and having an opening therein, a plurality of segments together forming a nut, the segments being housed within the shell and peripherally tapered to engage and be guided by the shell, means for preventing rotation of the nut segments with respect to the shell, resilient means urging the nut segments toward the larger end of the shell, a cup shaped member movable in the opening in the plate, and a plurality of resilient fingers carried by the cup shaped member and engaging the nut segments and the edge of the opening in the plate, said fingers bending over the cup shaped member and being movable when the cup shaped member is engaged by a bolt inserted through the opening in the smaller end of the shell and between the nut segments for forcing the nut segments against the action of the resilient means toward the smaller end of the shell into engagement with the bolt.

6. A nut assembly comprising, a tapered shell having an opening at its smaller end, a plate on the larger end of the shell, a plurality of segments together forming a nut, the segments being housed within the shell and peripherally tapered to engage and be guided by the means for preventing rotation of the nut segments with respect to the shell, resilient means including tension springs connected between the plate and the nut segments for urging the nut segments toward the larger end of the shell, and means engaged by a bolt inserted through the opening in the smaller end of the shell and between the nut segments for forcing the nut segments against the action of the resilient means toward the smaller end of the shell into engagement with the bolt.

7. A nut assembly comprising, a tapered shell having an opening at its smaller end, a plurality of segments together forming a nut, the segments being housed within the shell and peripherally tapered to engage and be guided by the shell, means for preventing rotation of the nut segments with respect to the shell, cavities between the nut segments and the shell, resilient means including compression springs in said cavities engaging the shell and the nut segments for urging the nut segments toward the larger end of the shell, and means engaged by a bolt inserted through the opening in the smaller end of the shell and between the nut segments for forcing the nut segments against the action of the resilient means toward the smaller end of the shell into engagement with the bolt.

8. A nut assembly comprising, a tapered shell having an opening at its smaller end, a base plate on the smaller end of the shell, a plurality of segments together forming a nut, the segments being housed within the shell and peripherally tapered to engage and be guided by the shell, means for preventing rotation of the nut segments with respect to the shell, resilient means including a disc carried by the base plate and having resilient fingers engaging the nut segments for urging the nut segments toward the larger end of the shell, and means engaged by a bolt inserted through the opening in the smaller end of the shell and between the nut segments for forcing the nut segments against the action of the resilient means toward the smaller end of the shell into engagement with the bolt.

9. A nut assembly comprising, a tapered shell having an opening at its smaller end, a plurality of segments together forming a nut, the segments being housed within the shell and peripherally tapered to engage and be guided by the shell, means for preventing rotation of the nut segments with respect to the shell, resilient means urging the nut segments toward the larger end of the shell, means engaged by a bolt inserted through the opening in the smaller end of the shell and between the nut segments for forcing the nut segments against the action of the resilient means toward the smaller end of the shell into engagement with the bolt, and a dust cap over the larger end of the shell.

10. A nut assembly comprising, a tapered shell having at its smaller end an opening and a pair of side flanges, a mounting plate having an opening in alignment with the opening in the shell, ears overlying the side flanges of the shell, lugs for engaging the shell and mounting holes, a plurality of segments together forming a nut, the segments being housed within the shell and peripherally tapered to engage and be guided by the shell, means for preventing rotation of the nut segments with respect to the shell, and means for engaging the nut segments with a bolt inserted through the openings in the shell and mounting plate and between the nut segments.

11. A nut assembly comprising, a tapered shell having at its smaller end an opening and a pair of side flanges, a mounting plate having an opening in alignment with the opening in the shell, ears overlying the side flanges of the shell, lugs for engaging the shell and mounting holes, a plurality of segments together forming a nut, the segments being housed within the shell and peripherally tapered to engage and be guided by the shell, means for preventing rotation of the nut segments with respect to the shell, resilient means urging the nut segments toward the larger end of the shell, and means engaged by a bolt inserted through the openings in the shell and mounting plate and between the nut segments for forcing the nut segments against the action of the resilient means toward the smaller end of the shell into engagement with the bolt.

RAYMOND F. DONOVAN.

No references cited.